US008212967B2

(12) United States Patent
Park et al.

(10) Patent No.: US 8,212,967 B2
(45) Date of Patent: Jul. 3, 2012

(54) BACK LIGHT UNIT AND LIQUID CRYSTAL DISPLAY DEVICE THEREWITH

(75) Inventors: Hee Jeong Park, Gyeonggi-do (KR); Sang Hyun Ahn, Jeonranam-do (KR)

(73) Assignee: LG Display Co., Ltd, Seoul (KR)

( * ) Notice: Subject to any disclaimer, the term of this patent is extended or adjusted under 35 U.S.C. 154(b) by 703 days.

(21) Appl. No.: 12/318,435

(22) Filed: Dec. 29, 2008

(65) Prior Publication Data

US 2010/0053496 A1 Mar. 4, 2010

(30) Foreign Application Priority Data

Aug. 27, 2008 (KR) .................. 10-2008-0083992

(51) Int. Cl.
*G02F 1/1335* (2006.01)
*G09F 13/04* (2006.01)

(52) U.S. Cl. ............. 349/69; 349/61; 349/68; 362/97.2; 362/97.3

(58) Field of Classification Search ............. 349/61, 349/68, 69; 362/97.2, 97.3
See application file for complete search history.

(56) References Cited

U.S. PATENT DOCUMENTS

2006/0139952 A1* 6/2006 Inoue et al. .............. 362/613
2007/0086181 A1* 4/2007 Hatanaka et al. .......... 362/97
2009/0096955 A1* 4/2009 Konno et al. ............. 349/64

FOREIGN PATENT DOCUMENTS

| CN | 101057175 | 10/2007 |
| CN | 201053588 | 4/2008 |
| JP | 2006-267780 | 10/2006 |
| JP | 2007-317423 | 12/2007 |

* cited by examiner

*Primary Examiner* — Michael Caley
(74) *Attorney, Agent, or Firm* — Morgan, Lewis & Bockius LLP

(57) ABSTRACT

A backlight unit includes a cover bottom having a plurality of light source groups each with a plurality of light sources thereon, wherein the light sources with the higher brightness are arranged in the light source group closer to a center portion of the cover bottom, and the light sources with the lower brightness are arranged in the light source group closer to a periphery of the cover bottom.

9 Claims, 10 Drawing Sheets

BACK LIGHT UNIT AND LIQUID CRYSTAL DISPLAY DEVICE THEREWITH

This application claims the benefit of Korean Patent Application No. 10-2008-083992, filed on Aug. 27, 2008, which is hereby incorporated by reference as if fully set forth herein.

BACKGROUND OF THE INVENTION

1. Field of the Invention

The present invention relates to backlight units, and more particularly, to a backlight unit and a liquid crystal display device therewith which can increase brightness.

2. Discussion of the Related Art

Among the display devices, there are light emitting display devices, such as cathode ray tubes, organic electro-luminescence display devices, plasma display devices PDP, and so on, and light receiving type display devices which can not emit a light to require a light source additionally, such as liquid crystal display devices.

A liquid crystal display device is provided with two display plates each having an electric field generating electrode and a layer of liquid crystals having dielectric anisotropy. A desired image can be obtained by applying a voltage to the electric field generating electrodes to form an electric field at the liquid crystal layer, and varying the voltage to control an intensity of the electric field to control a transmissivity of the light passing through the liquid crystal layer. The light may be from an artificial light source provided separately, or a natural light source.

In general, as the light source of the liquid crystal display device, a plurality of lamps are used, such as fluorescent lamps like external electrode fluorescent lamps EEFL, or cold cathode fluorescent lamps CCFL, or light emitting diodes LED, for directing a light throughout the liquid crystal display panel uniformly from a rear of the liquid crystal display panel.

Light emitting diode LED backlight unit for the liquid crystal display device, of which research and development is underway actively presently, enable the fabrication of thin display devices, and production of near-natural color. In order to utilize the advantages, production of a high brightness is required. However, the random arrangement of the LEDs or a LED package having luminous fluxes different from one another in the related art fails to provide adequate brightness to a central portion of the image.

SUMMARY OF THE INVENTION

Accordingly, the present invention is directed to a backlight unit and a liquid crystal display device therewith that substantially obviate one or more problems due to limitations and disadvantages of the related art.

An object of the present invention is to increase the brightness of a backlight unit for a liquid crystal display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes a cover bottom having a plurality of light source groups each with a plurality of light sources thereon, wherein the light sources with the higher brightness are arranged in the light source group closer to a center portion of the cover bottom, and the light sources with the lower brightness are arranged in the light source group closer to a periphery of the cover bottom.

In another aspect, a backlight unit and a liquid crystal display device therewith in which light emitting diodes having different luminous fluxes are classified according to sizes of the luminous fluxes, and the light emitting diode with a relatively greater luminous flux is arranged closer to a center portion of the cover bottom, and, opposite to this, the light emitting diode with a relatively smaller luminous flux is arranged farther from the center portion of the cover bottom, for increasing the brightness.

The light sources in the same light source group have luminous flux the same with one another, and the light sources in different light source groups have luminous flux different form one another.

The light source groups are formed on the cover bottom to surround the center portion of the cover bottom, and distances from the center portion of the cover bottom to the light source groups are different from one another, respectively.

The backlight unit further includes a supplementary light source group formed between the light source groups adjacent to each other for reducing a difference of brightness between the light source groups adjacent to each other.

The supplementary light source group includes two kinds of light sources having brightness different from each other, wherein the brightness of one kind of the supplementary light sources in the supplementary light source group is the same with the brightness of the light sources in one of the two light source groups adjacent to each other, and the brightness of the other kind of the supplementary light sources in the supplementary light source group is the same with the brightness of the light sources in the other one of the two light source groups adjacent to each other.

The two kinds of supplementary light sources in the supplementary light source group are arranged, alternately.

The supplementary light source group includes a first and a second unit supplementary light source groups, a first unit light source group is arranged closer to one of the two light source groups adjacent to each other, a second unit light source group is arranged closer to the other one of the two light source groups adjacent to each other, wherein each of the unit supplementary light source groups includes two kinds of supplementary light sources having brightness different from each other, wherein the brightness of one kind of the supplementary light sources in each of the unit supplementary light source groups is the same with the brightness of light sources in one of the light source groups of the two light source groups adjacent to each other, and the brightness of the other kind of the supplementary light sources in each of the unit supplementary light source groups is the same with the brightness of light sources in the other one of the light source groups of the two light source groups adjacent to each other.

The two kinds of the supplementary light sources in each of the unit supplementary light source groups are arranged alternately, and any one kind of the supplementary light sources in the first unit supplementary light source group and any one kind of the supplementary light sources in the second unit supplementary light source group having the brightness the same with the one kind of the supplementary light sources in the first unit supplementary light source group are arranged in zigzag.

The two kinds of light sources arranged along a short side direction of one side of the cover bottom in each of the unit supplementary light source groups are arranged alternately, and, of the supplementary light sources arranged alternately, any one kind of the supplementary light sources in the first unit supplementary light source group and any one kind of the supplementary light sources in the second unit supplementary light source group having brightness the same with the one kind of the supplementary light sources in the first unit supplementary light source group are arranged in zigzag.

The two kinds of light sources arranged along a long side direction of one side of the cover bottom in each of the unit supplementary light source groups are arranged alternately, and, of the supplementary light sources arranged alternately, any one kind of the supplementary light sources in the first unit supplementary light source group and any one kind of the supplementary light sources in the second unit supplementary light source group having brightness the same with the one kind of the supplementary light sources in the first unit supplementary light source group are arranged in zigzag.

The backlight unit further includes a reflective plate formed on an inside bottom surface of the cover bottom for reflecting the light from the light sources upward, and a diffusing plate positioned over the light sources for diffusing the light from the light sources, wherein an optical distance from the reflective plate from the diffusing plate is 0.1 mm~10 mm.

The backlight unit further includes a diffusing sheet over the diffusing plate for diffusing the light from the diffusing plate, at least one prism sheet over the diffusing sheet for increasing brightness the light from the diffusing sheet, and a multi-layered optical film over the prism sheet for converting an S-wave to a P-wave of the light.

In another aspect, a liquid crystal display device includes a liquid crystal display panel for displaying an image, a backlight unit including a cover bottom with opened opposite sides, a plurality of light sources mounted to a bottom surface of the cover bottom, and side supports secured to opened opposite sides of the cover bottom for reflecting the light from the light sources, for providing the light toward the liquid crystal display panel, a main support having a rear surface secured to the cover bottom, and a top case having a rectangular rim mounted and fastened to the support main and the cover bottom, wherein the light sources with the higher brightness relatively are arranged in the light source group positioned the closer to a center portion of the cover bottom, and the light sources with the lower brightness relatively are arranged in the light source group positioned the closer to a periphery of the cover bottom.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
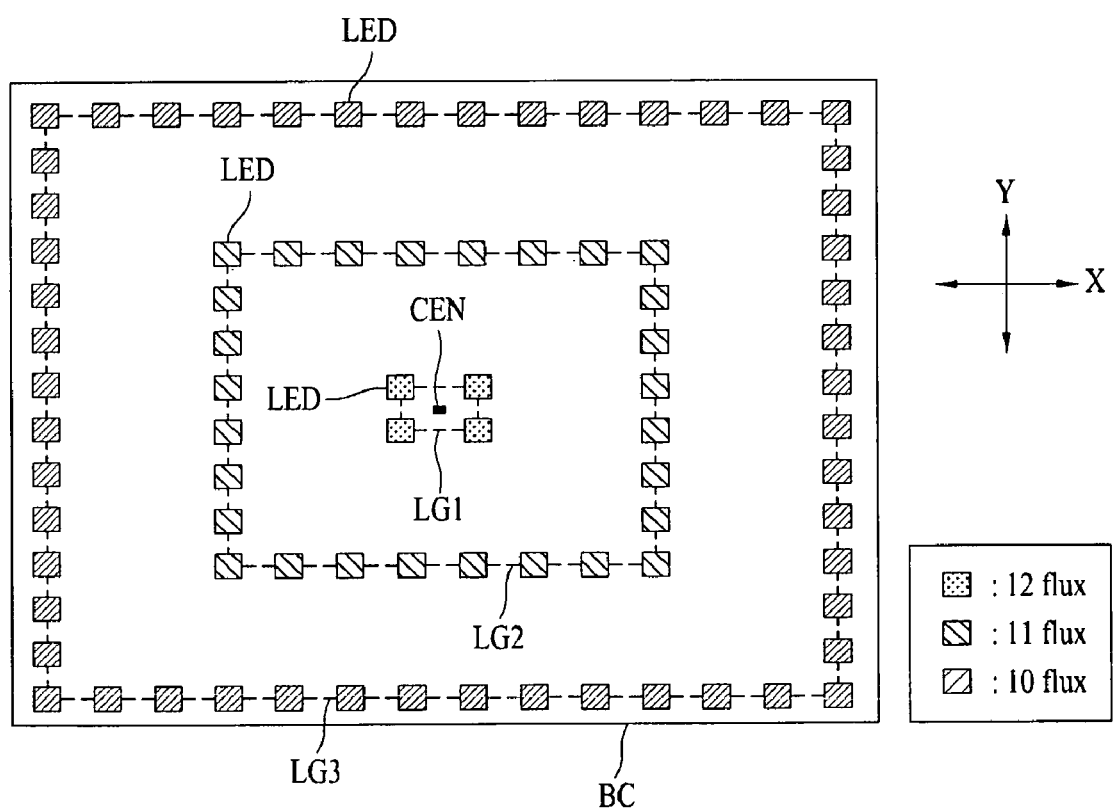
FIG. 1 illustrates a diagram of a backlight unit in accordance with a first preferred embodiment of the present invention.

FIG. 1 illustrates a diagram of a backlight unit in accordance with a first preferred embodiment of the present invention. Referring to FIG. 1, the backlight unit includes a cover bottom BC having a plurality of light source groups LG1~LG3 each having a plurality of light sources LED. Light sources LEDs of relatively higher brightness are arranged in the light source group positioned closer to a center portion CEN of the cover bottom BC, and light sources LEDs of relatively lower brightness are arranged in the light source group positioned closer to a periphery of the cover bottom BC. That is, a light source LED having the higher brightness is arranged in the light source group positioned the closer to the center portion CEN of the cover bottom BC, and, opposite to this, a light source LED having the lower brightness is arranged in the light source group positioned the farther from the center portion CEN of the cover bottom BC.

As the light source, a light emitting diode which emits a white light is used.

The light source groups are arranged to surround the center portion CEN of the cover bottom BC, at distances from the center portion CEN of the cover bottom BC to the light source groups LG1~LG3 different from one another. That is, a distance from the center portion CEN of the cover bottom BC to the first light source groups LG1, a distance from the center portion CEN of the cover bottom BC to the second light source groups LG2, and a distance from the center portion CEN of the cover bottom BC to the third light source groups LG3, are different from one another. In detail, the distance from the center portion CEN of the cover bottom BC to the first light source groups LG1 is the shortest, the distance from the center portion CEN of the cover bottom BC to the second light source groups LG2 is shorter, and the distance from the center portion CEN of the cover bottom BC to the third light source groups LG3 is the farthest.

Referring to FIG. 1, the light source LED arranged in the first light source group LG1 positioned the closest to the center portion CEN of the cover bottom BC has the highest brightness, and the light source LED arranged in the third light source group LG3 positioned the farthest from the center portion CEN of the cover bottom BC has the lowest brightness. The light source LED arranged in the second light source group LG2 has a brightness lower than the brightness of the light source LED in the first light source group LG1, and higher than the brightness of the light source LED in the third light source group LG3.

Though FIG. 1 illustrates only three light source groups LG1~LG3, this is for the sake of convenience of description. A number of the light source group may be four or more than four, or below three.

The light sources LEDs in one light source group have the same luminous flux. The light flux is a quantity of light emitted from the light source per an hour. A great value of the light flux means that the brightness of the light source is great.

A word that the luminous fluxes are the same means that the luminous fluxes of the light sources LEDs are positioned within an allowable error range even if the luminous fluxes are not the same with each other, exactly. In the meantime, the light sources LEDs positioned in the light source groups different from each other have luminous fluxes different from each other.

For an example, referring to FIG. 1, let us assume that the light sources LEDs in the first light source group LG1 have 12 luminous fluxes respectively, the light sources LEDs in the second light source group LG2 have 11 luminous fluxes respectively, and the light sources LEDs in the third light source group LG3 have 10 luminous fluxes respectively. In this instance, the light sources LEDs in the first light source group LG1 have luminous fluxes respectively which fall, for an example, within an allowable error range of higher than 11.5~lower than 12.5, the light sources LEDs in the second light source group LG2 have luminous fluxes respectively which fall, for an example, within an allowable error range of higher than 10.5~lower than 11.5, and the light sources LEDs in the third light source group LG3 have luminous fluxes respectively which fall, for an example, within an allowable error range of higher than 9.5~lower than 10.5.

In an embodiment, the backlight unit can provide a light of a higher brightness than the related art random arrange type of backlight unit by classifying light emitting diodes LEDs having different luminous fluxes according to quantity of the luminous fluxes, and arranging the light emitting diode with a relatively greater luminous flux the closer to the center portion CEN of the cover bottom BC, and, opposite to this, the light emitting diode with a relatively smaller luminous flux the farther from the center portion CEN of the cover bottom BC.

FIG. 2A illustrates a diagram of a related art experimental random arrangement type. FIG. 2B illustrates a diagram of an experimental random arrangement type according to an embodiment of the invention. As shown in the FIG. 2A, the three kinds of light sources LEDs are arranged on the cover bottom BC, randomly. As shown in the FIG. 2B, the light source LED with the relatively higher luminous flux is arranged the closer to the center portion CEN of the cover bottom BC, and, opposite to this, the light source LED with the relatively lower luminous flux is arranged the farther from the center portion CEN of the cover bottom BC. A numeral in the light source LED is the luminous flux of the light source LED.

FIG. 3A illustrates a diagram of an experiment result corresponding to the arrangement in FIG. 2A. FIG. 3B illustrates a diagram of an experiment result corresponding to the arrangement in FIG. 2B. In an embodiment, the brightness of the center portion CEN of the backlight unit is higher than the brightness of the center portion CEN of the backlight unit in the related art. Above experiment is a result of measurement by using simulation program. The related art and an embodiment of the present invention will be compared by using actual products as follows.

Figure 4:
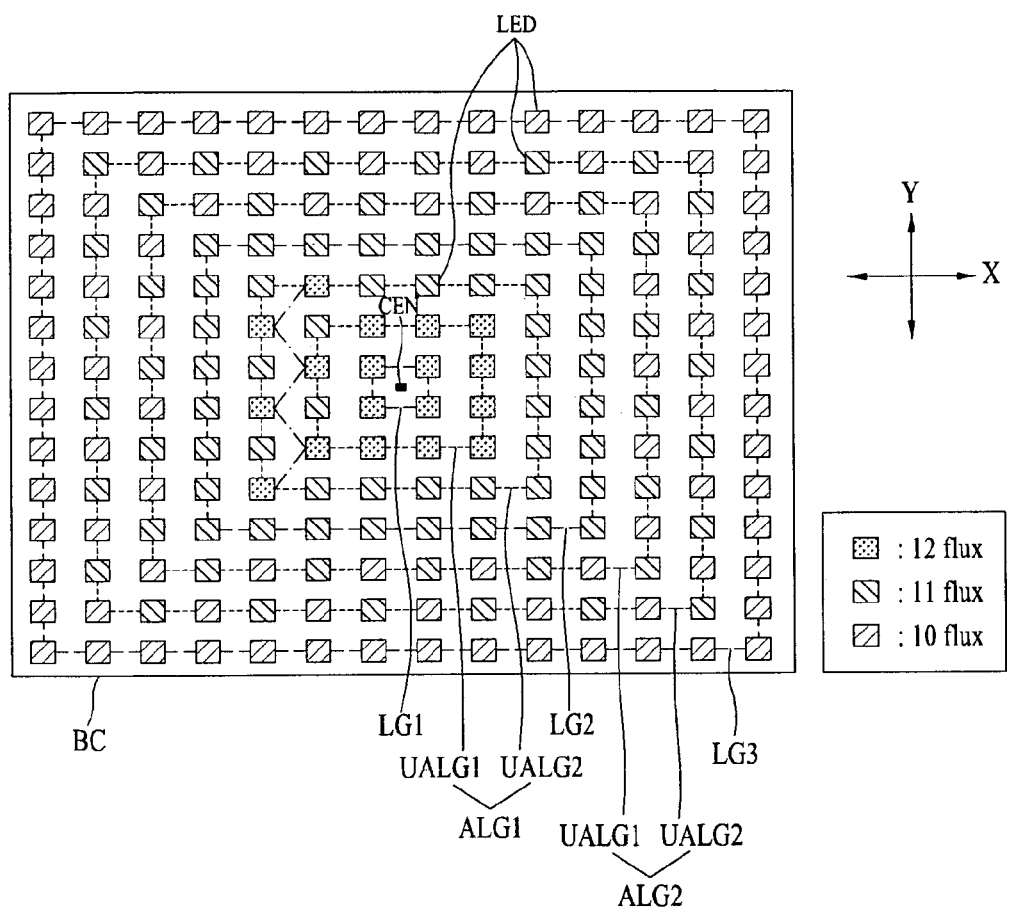
FIG. 4 illustrates a diagram of a backlight unit in accordance with a fourth preferred embodiment of the present invention.

FIG. 4 illustrates a diagram for comparing brightness of a backlight unit having a related art arrangement applied thereto and a backlight unit according to an embodiment of the present invention, respectively, respectively. FIG. 4 illustrates a cover bottom BC with two regions, wherein a left side region D1 has light sources LEDs arranged according to the first embodiment of the present invention, and a right side region D2 has light sources LEDs arranged according to the related art. In this instance, the left side region D1 has a plurality of light sources LEDs each having 12 to 13 luminous flux arranged thereon, with an average luminous flux of 12.5. The right side region D2 has a plurality of light sources LEDs each having 10 to 11 luminous flux arranged thereon, with an average luminous flux of 10.5. That is, the average luminous flux from the light sources LEDs on the left side region D1 is about 20% greater than the average luminous flux from the right sources LEDs on the right side region D2.

The bottom cover has reflectors which are positioned between a bottom surface of the bottom cover and the light sources LEDs for reflecting the light from the light sources toward the liquid crystal display panel. A diffusing plate, a diffusing sheet, and a prism sheet are stacked over the light sources LEDs. The diffusing plate and the diffusing sheet diffuse the light from the light source LEDs, and the prism sheet increases brightness of the light passed through the diffusing sheet. In this instance, the prism sheet has one or a plurality of sheets. A multi-layered optical film (MOF: DBEF-D) may be further added to a top one of the optical sheets, finally. The multi-layered optical film turns an S-wave which can not pass through the film into a P-wave for making the image of the liquid crystal display device brighter.

As can be noted from FIG. 4, the center brightness of the left side region D1 is higher than the center brightness of the right side region D2. That is, it can be noted that the center brightness 7990.5020 of the left side region D1 is about 30% higher than the center brightness 5800.4194 of the right side region D2. In the meantime, since the average luminous flux of the left side region D1 is about 20% higher than the average luminous flux of the right side region D2, it is deemed that an average brightness according to an embodiment of the present invention is about 10% higher than an average brightness in the related art.

In the meantime, in order to prevent a difference of brightness from taking place between two adjacent light source groups, the following supplementary light source groups may be used.

Figure 2:
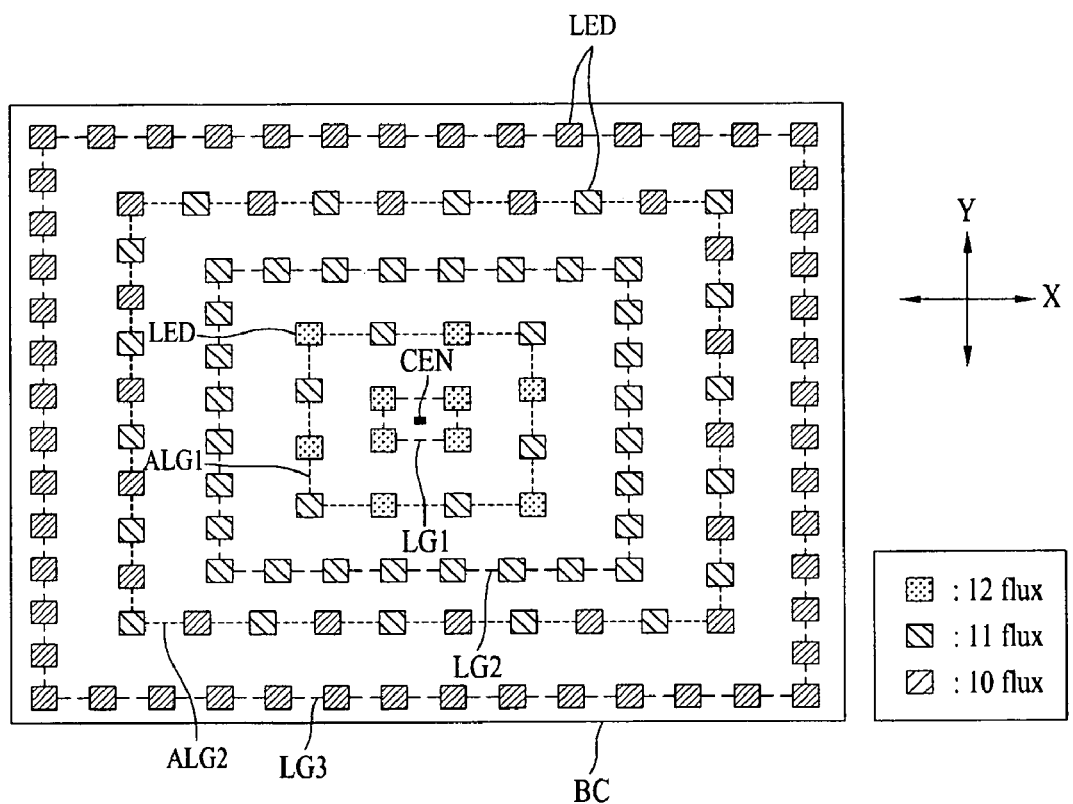
FIG. 2 illustrates a diagram of a backlight unit in accordance with a second preferred embodiment of the present invention.

FIG. 2 illustrates a diagram of a backlight unit in accordance with a second preferred embodiment of the present invention.

Referring to FIG. 2, the backlight unit includes a cover bottom BC having a plurality of light source groups LG1~LG3 each having a plurality of light sources LED. Light sources LEDs of relatively higher brightness are arranged in the light source group positioned closer to a center portion CEN of the cover bottom BC, and light sources LEDs of relatively lower brightness are arranged in the light source group positioned closer to a periphery of the cover bottom BC. That is, a light source LED having the higher brightness is arranged in the light source group positioned the closer to the center portion CEN of the cover bottom BC, and, opposite to this, a light source LED having the lower brightness is arranged in the light source group positioned the farther from the center portion CEN of the cover bottom BC.

Particularly, the backlight unit in accordance with the second preferred embodiment of the present invention further includes supplementary light source groups ALG1~ALG3 between the light source groups LG1~LG3 adjacent to each other, respectively. The supplementary light source groups ALG1~ALG3 serve to reduce a difference of brightness between adjacent light source groups. For this, the supplementary light sources ALG1~ALG3 have supplementary light sources LEDs having brightness the same with the light sources LEDs in the adjacent light source groups. The supplementary light source groups are also arranged to surround the center portion CEN of the cover bottom BC.

Each of the supplementary light source groups ALG1~ALG3 includes two kinds of supplementary light sources LEDs having brightness different from each other; one kind of the supplementary light sources LEDs have brightness the same with the brightness of the light sources LEDs in one of the adjacent light source groups, and the other kind of the supplementary light sources LEDs have brightness the same with the brightness of the light sources LEDs in the other one of the adjacent light source groups.

For an example, referring to FIG. 2, the first supplementary light source group ALG1 is positioned between the first light source group LG1 and the second light source group LG2. The first supplementary light source group ALG1 includes first supplementary light sources LEDs having luminous flux the same with the luminous flux of the first light source group LG1 and second supplementary light sources LEDs having luminous flux the same with the luminous flux of the second light source group LG2. In this instance, the first supplementary light sources LEDs and the second supplementary light sources LEDs are arranged alternately to each other in the first supplementary light source group ALG1. That is, the first and second supplementary light sources LEDs are arranged on an outer side of the first light source group LG1 to surround the center portion CEN of the cover bottom BC, wherein the first and second supplementary light sources LEDs are arranged alternately along the outer side of the first light source group LG1.

Thus, since the first supplementary light source ALG1 has the first supplementary light sources LEDs and the second supplementary light sources LEDs mixed with each other, the brightness of the light from the first and second supplementary light sources LEDs in the first supplementary light source ALG1 has brightness higher than the brightness of the light from the first light source group LG1 and lower than the brightness of the light from the second light source group LG2. That is, since the brightness of the first supplementary light source group ALG1 has a middle value of the brightness of the first light source group LG1 and the second light source group LG2, the first supplementary light source group ALG1 serves to attenuate the difference of brightness between the first light source group LG1 and the second light source group LG2.

Figure 3:
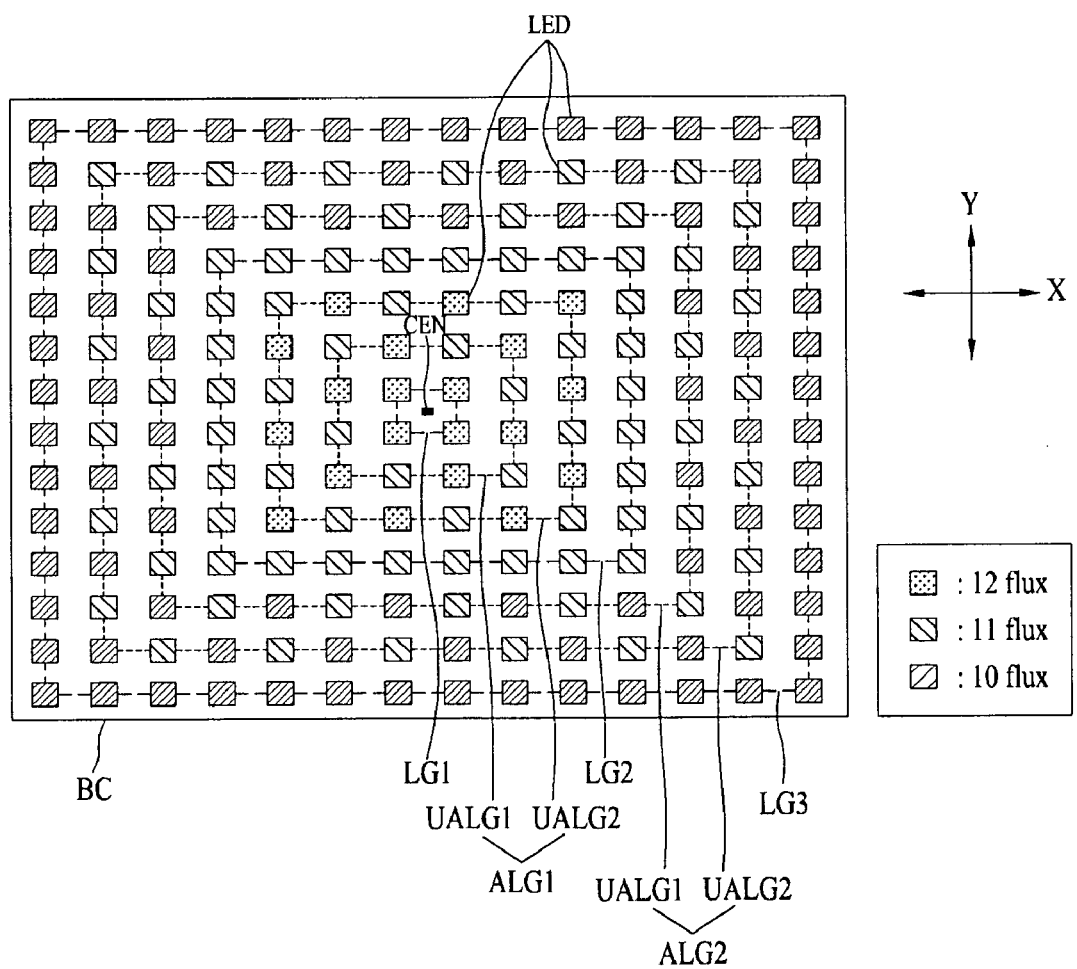
FIG. 3 illustrates a diagram of a backlight unit in accordance with a third preferred embodiment of the present invention.

FIG. 3 illustrates a diagram of a backlight unit in accordance with a third preferred embodiment of the present invention.

Referring to FIG. 3, the backlight unit in accordance with a third preferred embodiment of the present invention is similar to the backlight unit in accordance with the second preferred embodiment of the present invention described before, except that the backlight unit in accordance with the third preferred embodiment of the present invention includes supplementary light source groups ALG1~ALG3 each having two unit supplementary light source groups UALG1 and UALG2.

The first unit supplementary light source group UALG1 is positioned closer to one of the adjacent two light source groups, and the second unit supplementary light source group UALG2 is positioned closer to the other one of the adjacent two light source groups. For an example, as shown in FIG. 3, the first supplementary light source group ALG1 positioned between the first light source group LG1 and the second light source group LG2 includes the first and second unit supplementary light source groups UALG1 and UALG2, wherein the first unit supplementary light source groups UALG1 is positioned closer to the first light source group LG1 than the second light source group LG2, and the second unit supplementary light source groups UALG2 is positioned closer to the second light source group LG2 than the second light source group LG1.

Each of the unit supplementary light source groups UALG1 and UALG2 includes two kinds of supplementary light sources LEDs having brightness different from each other; one kind of the supplementary light sources LEDs have brightness the same with the brightness of the light sources LEDs in one of the adjacent light source groups, and the other kind of the supplementary light sources LEDs have brightness the same with the brightness of the light sources LEDs in the other one of the adjacent light source groups.

For an example, referring to FIG. 3, the first unit supplementary light source group UALG1 positioned between the first light source group LG1 and the second light source group LG2 includes first supplementary light sources LEDs having luminous flux the same with the luminous flux of the first light source group LG1 and second supplementary light sources LEDs having luminous flux the same with the luminous flux of the second light source group LG2. In this instance, the first supplementary light sources LEDs and the second supplementary light sources LEDs are arranged alternately to each other in the first unit supplementary light source group UALG1. That is, the first and second supplementary light sources LEDs are arranged on an outer side of the first light source group LG1 to surround the center portion CEN of the cover bottom BC, wherein the first and second supplementary light sources LEDs are arranged alternately along the outer side of the first light source group LG1.

Along with this, the second unit supplementary light source group UALG2 positioned between the first light source group LG1 and the second light source group LG2 includes first supplementary light sources LEDs having luminous flux the same with the luminous flux of the first light source group LG1 and second supplementary light sources LEDs having luminous flux the same with the luminous flux of the second light source group LG2. In this instance, the first supplementary light sources LEDs and the second supplementary light sources LEDs are arranged alternately to each other in the second unit supplementary light source group UALG2. That is, the first and second supplementary light sources LEDs are arranged on an outer side of the first unit supplementary light source group UALG1 to surround the center portion CEN of the cover bottom BC, wherein the first and second supplementary light sources LEDs are arranged alternately along the outer side of the first unit supplementary light source group UALG1.

FIG. 4 illustrates a diagram of a backlight unit in accordance with a fourth preferred embodiment of the present invention.

The backlight unit in accordance with a fourth preferred embodiment of the present invention is similar to the backlight unit in accordance with the third preferred embodiment of the present invention described above, except that the backlight unit in accordance with the fourth preferred embodiment of the present invention has two kinds of supplementary light sources LEDs only on one short side of the cover bottom BC in each of unit supplementary light source groups UALG1 and UALG2 are arranged, alternately. That is, the cover bottom BC has opposite two short sides each having a length in a Y-axis direction, and opposite two long sides each having a length in an X-axis direction, wherein only the two kinds of supplementary light sources LEDs positioned closer to one of the two short sides of the cover bottom BC are arranged, alternately as shown in FIG. 4. Moreover, of the supplementary light sources LEDs arranged alternately, any one kind of the supplementary light sources LEDs in the first unit supplementary light source group UALG1 and any one kind of the supplementary light sources LEDs in the second unit supplementary light source group UALG2 having brightness the same with the one kind of the supplementary light sources LEDs in the first unit supplementary light source group UALG1 are arranged in zigzag.

As another method, of the two kinds of supplementary light sources LEDs in each of the unit supplementary light source groups UALG1 and UALG2, only the two kinds of supplementary light sources LEDs arranged along a length direction of the other side short side of the cover bottom BC may be arranged, alternately. That is, of the two short sides of the cover bottom BC, only the two kinds of the supplementary light sources LEDs positioned closer to the other short side (the other side short side) may be arranged, alternately.

As another method, of the two kinds of supplementary light sources LEDs in each of the unit supplementary light sources UALG1 and UALG2, the two kinds of supplementary light sources LEDs arranged along a length direction of one side short side and the other side short side of the cover bottom BC may be arranged, alternately.

Figure 5:
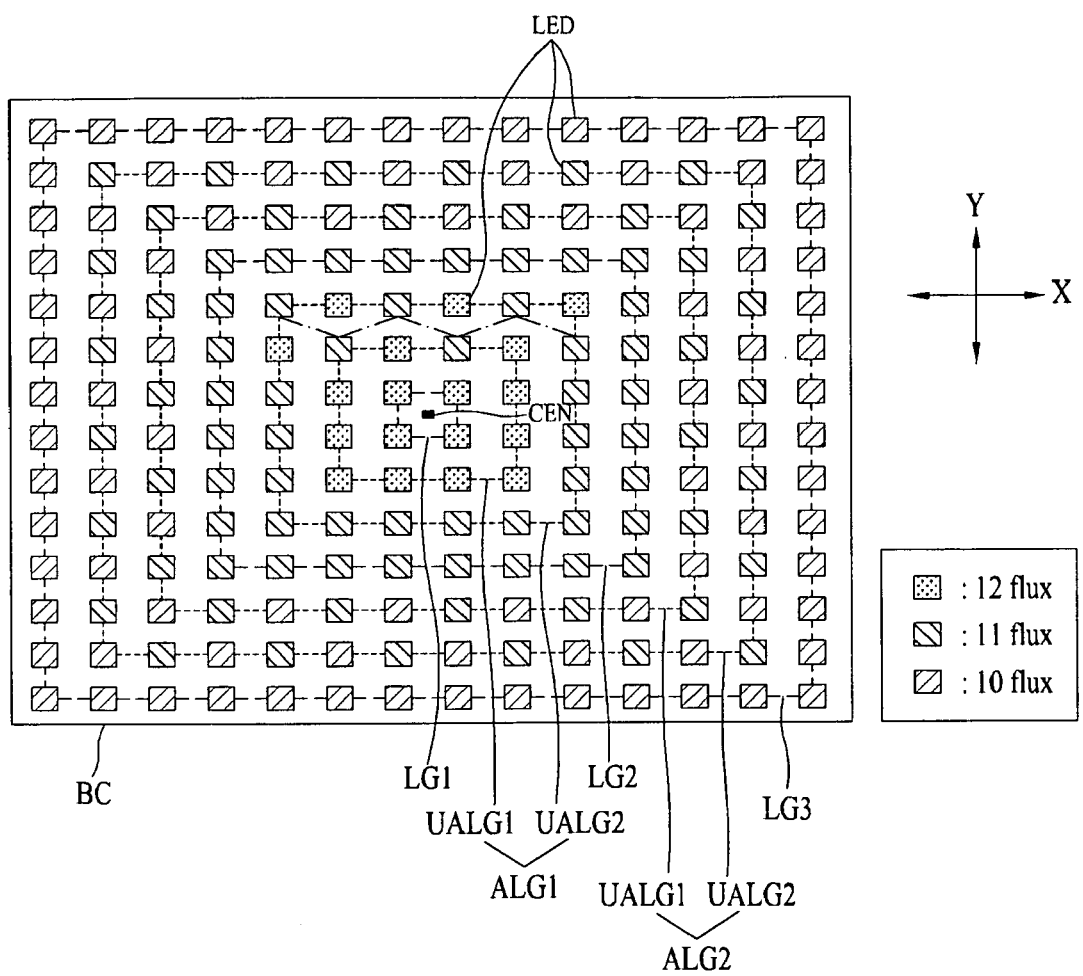
FIG. 5 illustrates a diagram of a backlight unit in accordance with a fifth preferred embodiment of the present invention.

FIG. 5 illustrates a diagram of a backlight unit in accordance with a fifth preferred embodiment of the present invention. The backlight unit in accordance with a fifth preferred embodiment of the present invention is similar to the backlight unit in accordance with the third preferred embodiment of the present invention described above, except that the backlight unit in accordance with the fifth preferred embodiment of the present invention has two kinds of supplementary light sources LEDs only on one long side of the cover bottom BC in each of unit supplementary light source groups UALG1 and UALG2 are arranged, alternately. That is, the cover bottom BC has opposite two short sides each having a length in a Y-axis direction, and opposite two long sides each having a length in an X-axis direction, wherein only the two kinds of supplementary light sources LEDs positioned closer to one of the two long sides of the cover bottom BC are arranged, alternately as shown in FIG. 5. Moreover, of the supplementary light sources LEDs arranged alternately, any one kind of the supplementary light sources LEDs in the first unit supplementary light source group UALG1 and any one kind of the supplementary light sources LEDs in the second unit supplementary light source group UALG2 having brightness the same with the one kind of the supplementary light sources LEDs in the first unit supplementary light source group UALG1 are arranged in zigzag.

As another method, of the two kinds of supplementary light sources LEDs in each of the unit supplementary light source groups, only the two kinds of supplementary light sources LEDs arranged along a length direction of the other side long side of the cover bottom BC may be arranged, alternately. That is, of the two long sides of the cover bottom BC, only the two kinds of the supplementary light sources LEDs positioned closer to the other long side (the other side long side) may be arranged, alternately.

As another method, of the two kinds of supplementary light sources LEDs in each of the unit supplementary light sources, the two kinds of supplementary light sources LEDs arranged along a length direction of one side long side and the other side long side of the cover bottom BC may be arranged, alternately.

As another method, of the two kinds of supplementary light sources LEDs in each of the unit supplementary light sources, the two kinds of supplementary light sources LEDs arranged along a length direction of one side short side, one side long side and the other side long side of the cover bottom BC may be arranged, alternately.

As another method, of the two kinds of supplementary light sources LEDs in each of the unit supplementary light sources, the two kinds of supplementary light sources LEDs arranged along a length direction of the side short side, one side long side and the other side long side of the cover bottom BC may be arranged, alternately.

As another method, of the two kinds of supplementary light sources LEDs in each of the unit supplementary light sources, the two kinds of supplementary light sources LEDs arranged along a length direction of the side short side, one side long side and the other side long side of the cover bottom BC may be arranged, alternately.

As another method, of the two kinds of supplementary light sources LEDs in each of the unit supplementary light sources, the two kinds of supplementary light sources LEDs arranged along a length direction of one side long side, one side short side and the other side short side of the cover bottom BC may be arranged, alternately.

As another method, of the two kinds of supplementary light sources LEDs in each of the unit supplementary light sources, the two kinds of supplementary light sources LEDs arranged along a length direction of the other side long side, one side short side and the other side short side of the cover bottom BC may be arranged, alternately.

In the meantime, one light source group may have a plurality of unit light source groups.

Figure 6:
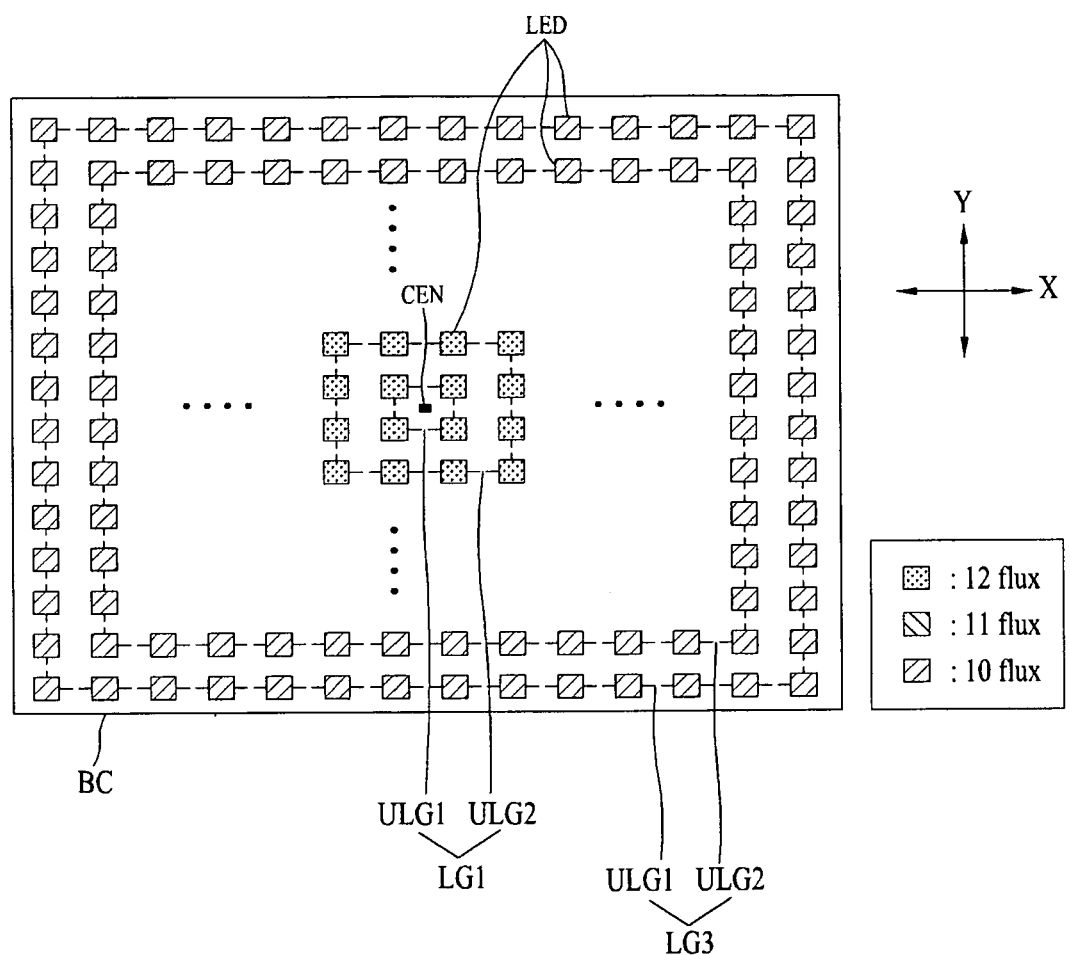
FIG. 6 illustrates a diagram for explaining a light source group having a plurality of unit light source groups.

FIG. 6 illustrates a diagram for explaining light source groups LG1~LG3 each having a plurality of unit light source groups. As shown in the FIG. 6, one light source group has a plurality of unit light source groups. For an example, the first light source group LG1 includes a first unit light source group ULG1 having a plurality of light sources LEDs and a second unit light source group ULG2 having another plurality of light sources LEDs. A third light source group LG3 also includes the first and second unit light source groups ULG1 and ULG2, and though not shown, the second light source group also includes the first and second unit light source groups. A number of the unit light source groups in each of the light source groups LG1 and LG2 may be three or more than three. The light source group described in FIG. 6 is applicable to each of the light source groups LG1~LG3 in any one of the first to fifth embodiments. The backlight unit formed thus can be mounted to a liquid crystal display device.

Figure 7:
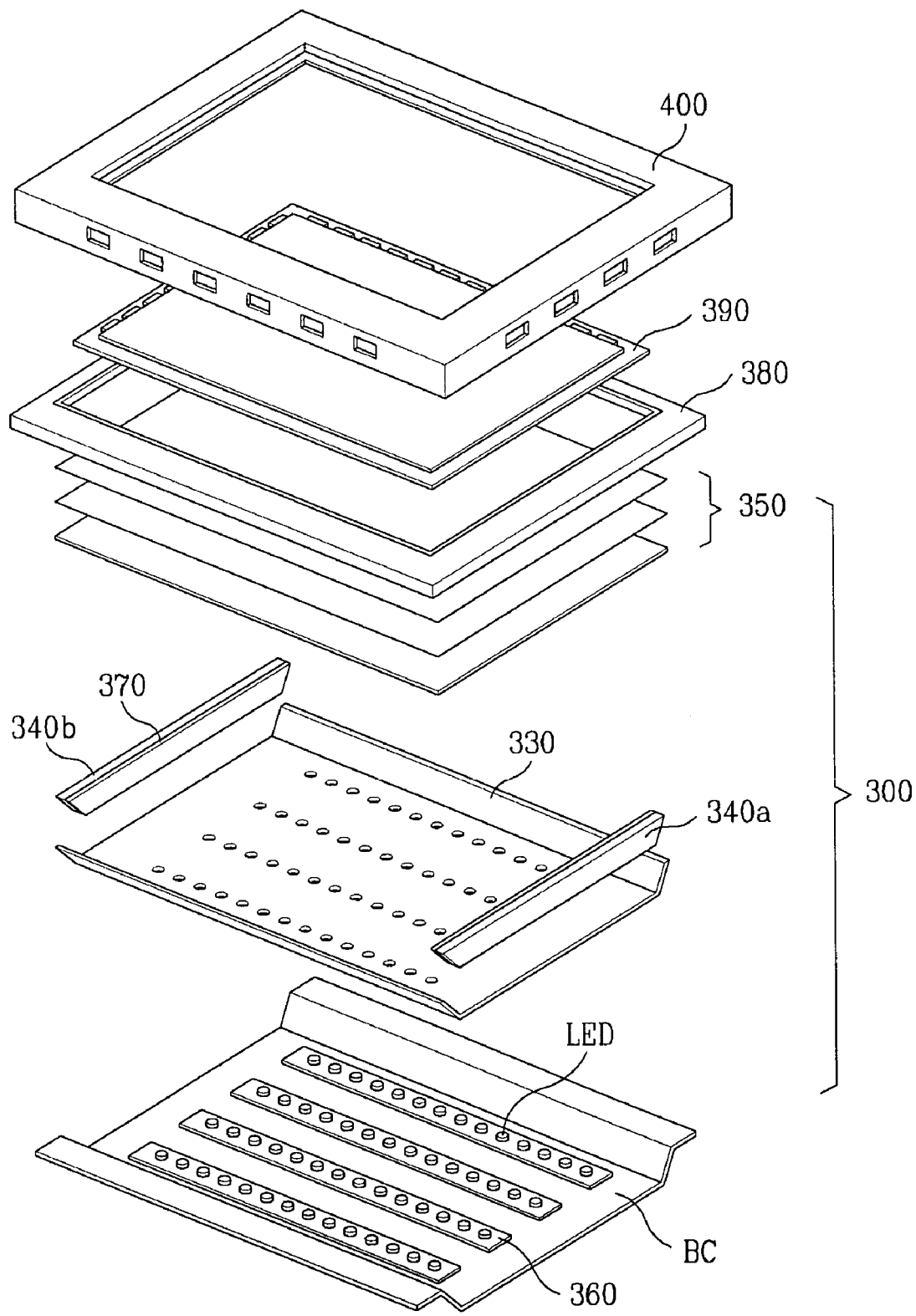
FIG. 7 illustrates a liquid crystal display device having a backlight unit of the present invention applied thereto.
Figure 8:
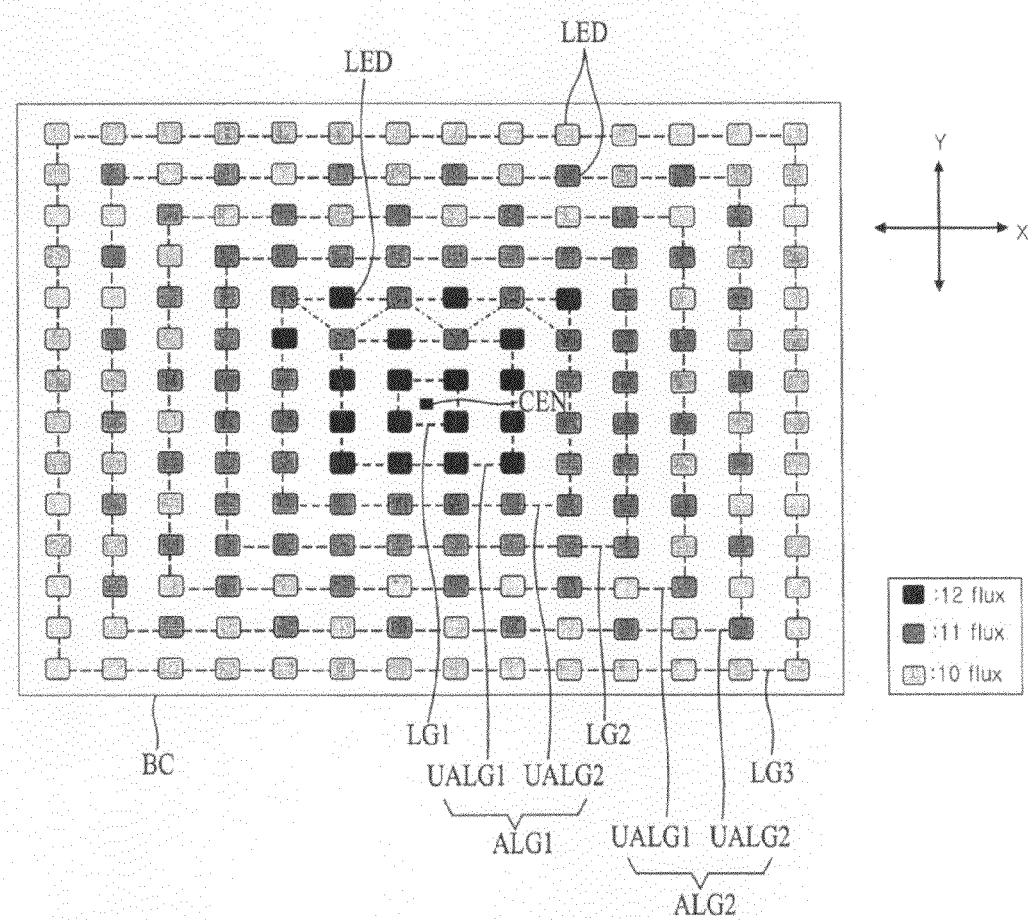
FIG. 8 illustrates a diagram of a backlight unit in accordance with a fifth preferred embodiment of the present invention.
Figure 9:
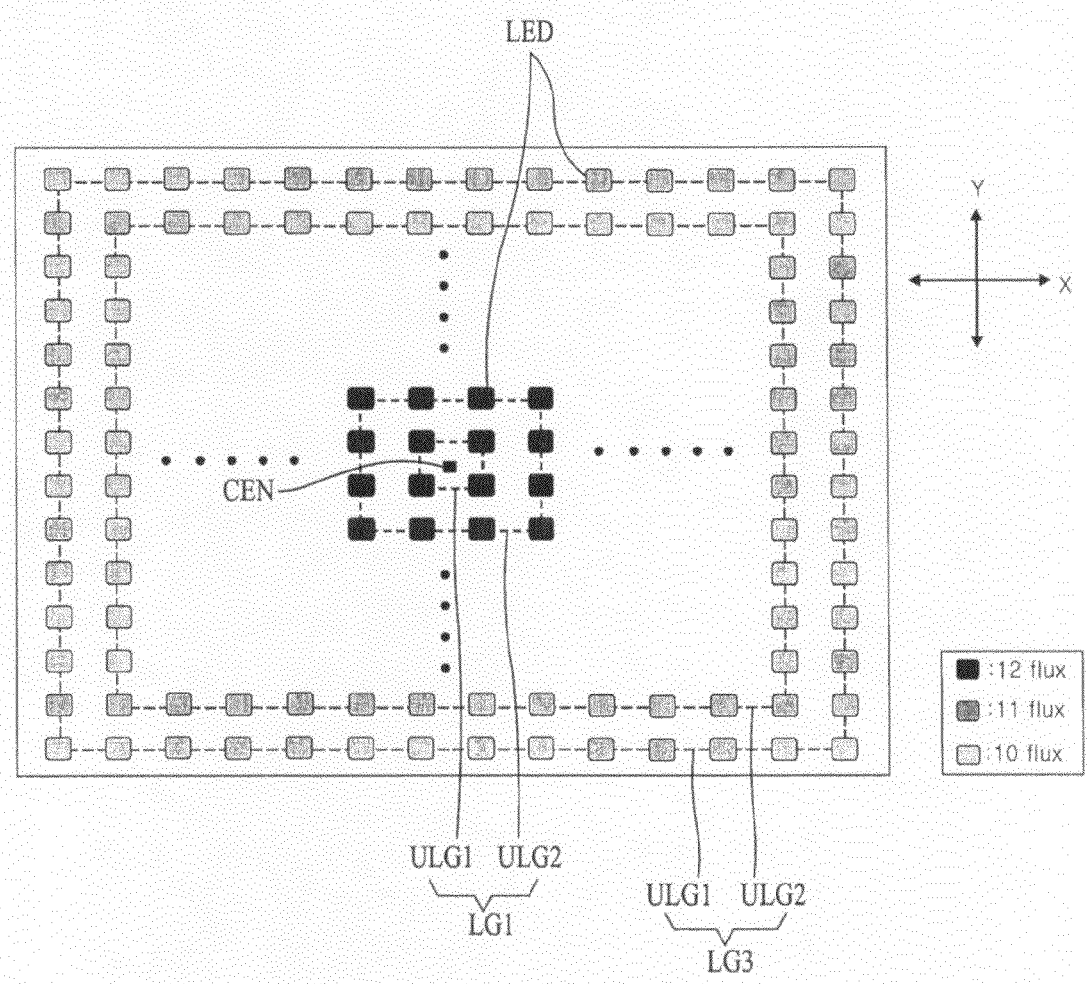
FIG. 9 illustrates a diagram for explaining a light source group having a plurality of unit light source groups.
Figure 10:
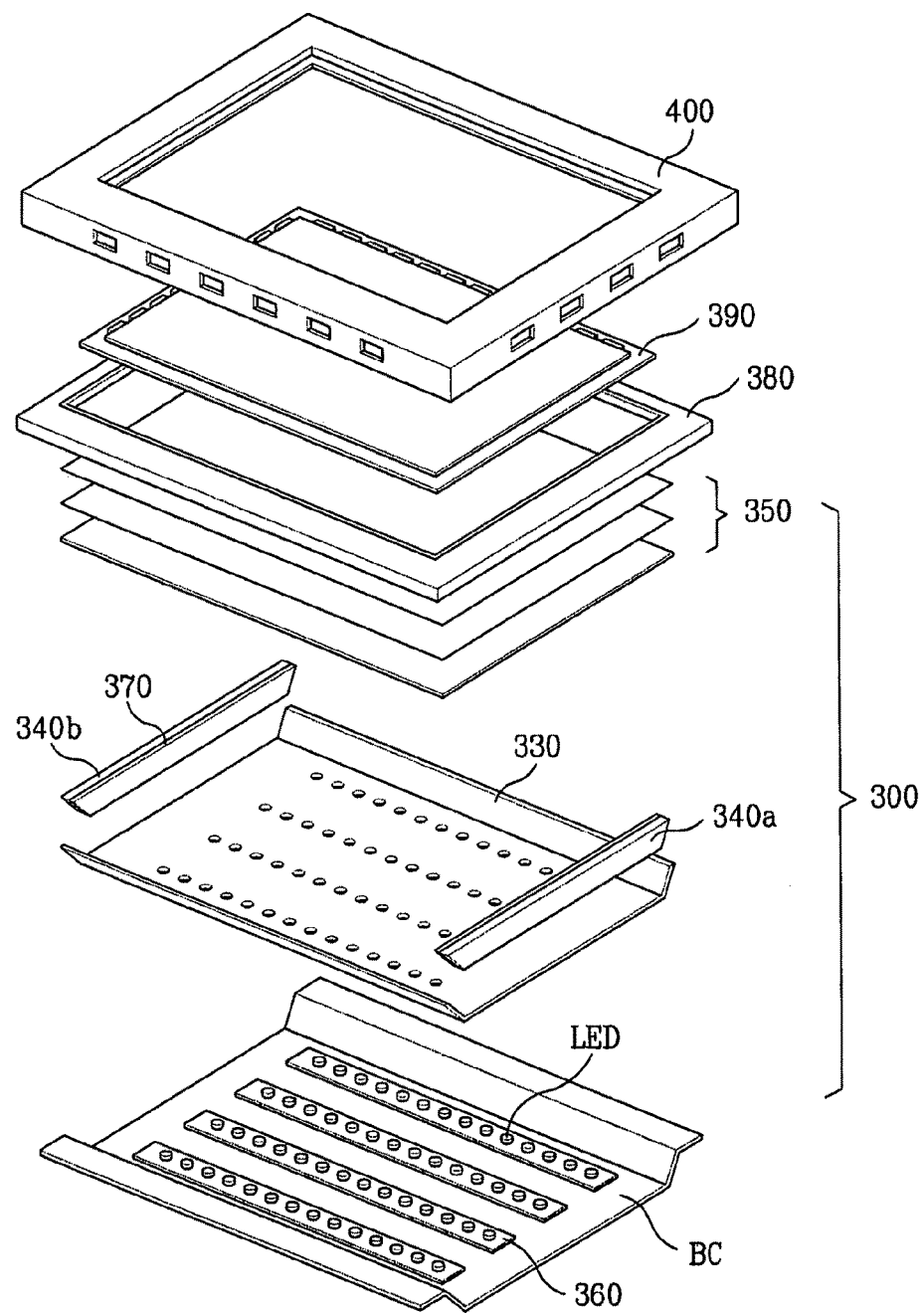
FIG. 10 illustrates a liquid crystal display device having a backlight unit of the present invention applied thereto.

FIG. 7 illustrates a liquid crystal display device having a backlight unit according to an embodiment of the present invention applied thereto. Referring to FIG. 7, the liquid crystal display device includes a backlight unit 300, a liquid crystal display panel 390, a support main 380, and a top case 400. The backlight unit 300 can be any one of the backlight units in the first to fifth embodiments described above.

The backlight unit 300 includes a cover bottom 310 having opened opposite sides, a plurality of light sources LEDs mounted to a bottom surface of the cover bottom BC, and side supports 340a and 340b secured to the opposite sides of the opened cover bottom BC for reflecting a light from the light sources LEDs. The side supports 340a and 340b may be formed as one unit with the cover bottom BC.

The light sources LEDs are mounted to a PCB (Printed Circuit Board) 360, for emitting the light upon reception of a driving current from an LED driver through the PCB 360.

A flat reflective member 330 has a plurality of pass through holes for placing the light sources LEDs therethrough respectively to cover the light sources LED such that only the light sources LEDs project beyond the flat reflective member. The flat reflective member 330 diffuses spot lights from the plurality of light sources LEDs widely.

Over the cover bottom BC, there are optical members 350 of a diffusing plate and a plurality of optical sheets. The diffusing plate diffuses the light from the plurality of light sources LEDs throughout an entire region of the liquid crystal display panel 100. On an inside bottom surface of the cover bottom, a reflective plate is formed for reflecting the light from the light sources LEDs toward the liquid crystal display panel. The backlight unit of the present invention is an ultra slim backlight unit with an optical distance of 3 mm~100 mm from the reflective plate to the diffusing plate.

The liquid crystal display panel 390 includes a transistor array substrate and a color filter array substrate bonded together to face each other, spacers (not shown) for maintaining a cell gap between the two array substrates constant, and a liquid crystal layer (not shown) filled in a liquid crystal space formed by the spacers.

The color filter array substrate includes a color filter, a common electrode, and a black matrix. The common electrode may be formed on the transistor array substrate.

The transistor array substrate includes thin film transistors formed at regions defined by a plurality of data lines (not shown) and a plurality of gate lines (not shown) and connected to the gate lines and the data lines respectively, and liquid crystal cells (not shown) connected to the thin film transistors, respectively.

The support main 380 has a rear surface secured to the cover bottom BC, the top case 400 which is a rectangular rim of the liquid crystal display panel 390 is mounted and fastened to the support main 380 and the cover bottom BC.

The cover bottom BC is joined with the support main 380 to form a bottom case which receives the backlight unit 300.

The top case 400 covers front edges of the liquid crystal display panel 390 placed on the cover bottom BC, and sides of the cover bottom BC. For this, the top case 400 includes a flat portion for covering the non-displaying region excluding the display region of the liquid crystal display panel 390, i.e., the edges, and a side portion bent perpendicular to the flat portion to cover the sides of the cover bottom BC.

As has been described, the backlight unit and the liquid crystal display device therewith of the present invention have the following advantages.

By arranging the light emitting diodes having the higher luminous flux relatively the closer to the center portion of the cover bottom and the light emitting diodes having the lower luminous flux relatively the farther from the center portion of the cover bottom, the brightness can be increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit, comprising:
a cover bottom having a plurality of light source groups each with a plurality of light sources thereon,
a supplementary light source group formed between the light source groups adjacent to each other for reducing a difference in brightness between the light source groups adjacent to each other,
wherein the light sources with the higher brightness are arranged in the light source group closer to a center portion of the cover bottom, and the light sources with the lower brightness are arranged in the light source group closer to a periphery of the cover bottom,
wherein the light source groups are on the cover bottom to surround the center portion of the cover bottom, and distances from the center portion of the cover bottom to the light source groups are different from one another, respectively,
wherein the supplementary light source group includes two kinds of supplementary light sources having brightness different from each other,
wherein the brightness of one kind of the supplementary light sources in the supplementary light source group is the same with the brightness of the light sources in one of the two light source groups adjacent to each other, and the brightness of the other kind of the supplementary light sources in the supplementary light source group is the same with the brightness of the light sources in the other one of the two light source groups adjacent to each other,
wherein the two kinds of supplementary light sources in the supplementary light source group are arranged alternately.

2. The backlight unit as claimed in claim 1, wherein the light sources in the same light source group have the same luminous flux, and the light sources in different light source groups have different luminous flux.

3. The backlight unit as claimed in claim 1, further comprising a reflective plate formed on an inside bottom surface of the cover bottom for reflecting the light from the light sources upward, and
a diffusing plate positioned over the light sources for diffusing the light from the light sources,
wherein an optical distance from the reflective plate to the diffusing plate is 0.1 mm~10 mm.

4. The backlight unit as claimed in claim 3, further comprising:
a diffusing sheet over the diffusing plate for diffusing the light from the diffusing plate;
at least one prism sheet over the diffusing sheet for increasing brightriess the light from the diffusing sheet; and
a multi-layered optical film over the prism sheet for converting an S-wave to a P-wave of the light.

5. A backlight unit, comprising:
a cover bottom having a plurality of light source groups each with a plurality of light sources thereon,
a supplementary light source group formed between the light source groups adjacent to each other for reducing a difference in brightness between the light source groups adjacent to each other,
wherein the light sources with the higher brightness are arranged in the light source group closer to a center portion of the cover bottom, and the light sources with the lower brightness are arranged in the light source group closer to a periphery of the cover bottom,
wherein the light source groups are on the cover bottom to surround the center portion of the cover bottom, and distances from the center portion of the cover bottom to the light source groups are different from one another, respectively, wherein the supplementary light source group includes a first and a second unit supplementary light source groups, a first unit light source group is arranged closer to one of the two light source groups adjacent to each other, a second unit light source group is arranged closer to the other one of the two light source groups adjacent to each other, wherein each of the unit supplementary light source groups includes two kinds of supplementary light sources having brightness different from each other, wherein the brightness of one kind of the supplementary light sources in each of the unit supplementary light source groups is the same with the brightness of light sources in one of the light source groups of the two light source groups adjacent to each other, and the brightness of the other kind of the supplementary light sources in each of the unit supplementary light source groups is the same with the brightness of light sources in the other one of the light source groups of the two light source groups adjacent to each other.

6. The backlight unit as claimed in claim 5, wherein the two kinds of the supplementary light sources in each of the unit supplementary light source groups are arranged alternately, and any one kind of the supplementary light sources in the first unit supplementary light source group and any one kind of the supplementary light sources in the second unit supplementary light source group having the brightness the same with the one kind of the supplementary light sources in the first unit supplementary light source group are arranged in zigzag.

7. The backlight unit as claimed in claim 5, wherein the two kinds of light sources arranged along a short side direction of one side of the cover bottom in each of the unit supplementary light source groups are arranged alternately, and, of the supplementary light sources arranged alternately, any one kind of the supplementary light sources in the first unit supplementary light source group and any one kind of the supplementary light sources in the second unit supplementary light source group having brightness the same with the one kind of the supplementary light sources in the first unit supplementary light source group are arranged in zigzag.

8. The backlight unit as claimed in claim 5, wherein the two kinds of light sources arranged along a long side direction of one side of the cover bottom in each of the unit supplementary light source groups are arranged alternately, and, of the supplementary light sources arranged alternately, any one kind of the supplementary light sources in the first unit supplementary light source group and any one kind of the supplementary light sources in the second unit supplementary light source group having brightness the same with the one kind of the supplementary light sources in the first unit supplementary light source group are arranged in zigzag.

9. A liquid crystal display device, comprising:

a liquid crystal display panel for displaying an image;

a backlight unit including a cover bottom with opened opposite sides, a plurality of light sources mounted to a bottom surface of the cover bottom, and side supports secured to opened opposite sides of the cover bottom for reflecting the light from the light sources for providing the light toward the liquid crystal display panel;

a main support having a rear surface secured to the cover bottom; and a top case having a rectangular rim mounted and fastened to the main support and the cover bottom, a supplementary light source group formed between the light source groups adjacent to each other for reducing a difference in brightness between the light source groups adjacent to each other, wherein the light sources with the higher brightness are arranged in a light source group closer to a center portion of the cover bottom, and the light sources with the lower brightness are arranged in a light source group positioned the closer to a periphery of the cover bottom, wherein the light source groups are on the cover bottom to surround the center portion of the cover bottom, and distances from the center portion of the cover bottom to the light source groups are different from one another, respectively, wherein the supplementary light source group includes two kinds of supplementary light sources having brightness different from each other, wherein the brightness of one kind of the supplementary light sources in the supplementary light source group is the same with the brightness of the light sources in one of the two light source groups adjacent to each other, and the brightness of the other kind of the supplementary light sources in the supplementary light source group is the same with the brightness of the light sources in the other one of the two light source groups adjacent to each other, wherein the two kinds of supplementary light sources in the supplementary light source group are arranged alternately.

* * * * *